United States Patent Office 3,532,675
Patented Oct. 6, 1970

3,532,675
POLYMERIZATION PROCESS
Jonathan B. Rivlin, West Haven, Conn., assignor to Olin Mathieson Chemical Corporation, a corporation of Virginia
No Drawing. Filed Oct. 17, 1968, Ser. No. 768,531
Int. Cl. C08f 1/13, 1/80, 15/40
U.S. Cl. 260—78.5        4 Claims

ABSTRACT OF THE DISCLOSURE

Copolymers of about 75% to 95% by weight vinylidene chloride with at least one vinyl or other ethylenically unsaturated monomer, are prepared by an emulsion polymerization process in the presence of substantially 0.05% to 10%, preferably 0.1% to 5%, by weight of the mixture of monomers of allyl bromide. The resulting copolymers display molecular weight or viscosity controlled within a desired reduced range, as well as excellent physical properties and improved solubility characteristics, being readily soluble in various solvents and solvent mixtures and capable of yielding concentrated solutions of surprisingly high fluidity. Such copolymers provide excellent coatings for cellophane and other polymeric films.

BACKGROUND OF THE INVENTION

This invention relates to the process of preparing improved vinylidene chloride, copolymers, and more particularly, to the control of the molecular weight within desired reduced ranges during the polymerization process, so that the resulting copolymer has excellent physical properties and improved solubility characteristics.

Vinylidene chloride copolymers prepared by a redox catalyzed emulsion polymerization process, as described for example in U.S. 2,462,422 and U.S. 3,041,208, have been extensively used, particularly for the coating of cellophane and other polymeric films. However, such copolymers have proved less versatile than desired, particularly with respect to solubility characteristics. They have shown ready solubility in only a few solvents or solvent mixtures, but solutions in even the most effective solvents were too viscous for use at the desired high concentrations. The use of known modifiers in the polymerization process or of changes in the reaction conditions, or of variations in the mixture of monomers results in some improvement, but further advances remained desirable.

SUMMARY OF THE INVENTION

In accordance with the present invention, generally stated, vinylidene chloride copolymers of improved solubility characteristics and desired physical properties are obtained by emulsion polymerization of the monomeric mixture in the presence of allyl bromide as modifier, generally in amounts within the range of 0.05 to 10%, preferably 0.1 to 5%, by weight of the mixture of monomers. It is noteworthy that other allyl compounds such as allyl acetate, alcohol, chloride or nitrile have been found to produce little or no appreciable modification in the polymerization reaction and allyl iodide is likewise ineffective in amounts less than 0.5%, while higher proportions, such as 1%, substantially prevent any polymerization within the usual reaction period.

In accordance with this invention, the use of allyl bromide as modifier is effective in the emulsion polymerization of monomeric charges containing about 75% to 95% vinylidene chloride and substantially the balance of at least one other ethylenically unsaturated monomer, for example acrylonitrile, alkyl acrylate or methacrylate, with the alkyl group containing 1 to 20 carbon atoms, methacrylonitrile, acrylic or methacrylic acid. Likewise, other ethylenically unsaturated compounds copolymerizable with vinylidene chloride may be used, for example, vinyl chloride, vinyl acetate, itaconic acid or anhydride, citraconic acid or anhydride, maleic acid or anhydride, mesaconic acid, or vinyl ether such as ethyl vinyl ether, a vinyl ketone such as methyl vinyl ketone, styrene, an allyl ketone such as propyl allyl ketone, an allyl ether such as ethyl allyl ether or allyl glycidyl ether, acrylamide, an alkyl acrylamide, or, generallly, an ester in which either the alcohol moiety or the acid moiety is characterized by ethylenic unsaturation.

The polymerization is carried out in a suitable vessel to which the above-described monomer charge, about an equal weight of water, emulsifying agent and catalyst are added and mixed initially at about room temperature. The emulsifying agent may be sodium dihexyl sulfosuccinate, sodium lauryl sulfate or sodium dodecyl benzene sulfonate or similar compound or mixture thereof amounting to up to about 5% by weight of the monomer charge and sufficient to maintain the charge in emulsified form. The catalyst is preferably comprised of ammonium persulfate and sodium metabisulfite or other redox system in an adequate proportion, generally up to 2% or 3% by weight, to enable completion of the polymerization in less than 6 hours, for example, in 1 to 3 hours. The reaction vessel is provided with a heat-exchange jacket or other means for maintaining the desired reaction temperature. The polymerization may be carried out at atmospheric pressure under reflux until the monomer has been substantially all reacted, as shown by the cessation of refluxing. Likewise, the polymerization may be carried out under pressure in a sealed reaction vessel at a temperature of about 50° C. to 60° C. and at a pressure up to about 50 pounds per square inch above atmospheric pressure.

The resulting aqueous copolymer dispersion may be filtered and applied directly for the coating of cellophane, paper, thermoplastic films or other substrates. Alternatively, the copolymer may be coagulated by treatment with aluminum sulfate, calcium chloride or other salt or with a lower alcohol such as ethanol or isopropanol, or by freezing and thawing the dispersion, and the precipitated copolymer, corresponding to substantially complete conversion of the monomer charge, may then be filtered, washed and dried. Coating lacquers may then be prepared by adding the desired proportion of solvent or solvent mixture, mixing at above room temperature, and the resulting lacquer is cooled to the coating temperature, generally at about 20° C. to 75° C.

PREFERRED EMBODIMENTS

The effective results attained in accordance with this invention are described in the following illustrative specific examples.

Polymerizations were carried out in a comparative series in which the monomer charge consisted of vinylidene chloride, acrylonitrile and acrylic acid in proportions by weight of 91:8:1, totalling 125 parts by weight, and the aqueous phase of the same total weight included 5 parts of sodium lauryl sulfate and the balance water. The reaction was initiated after the addition of the desired proportion of allyl bromide, by mixing in the catalyst, consisting of 0.93 part of ammonium persulfate and 0.62 part of sodium metabisulfite.

The reaction vessel was sealed and maintained in a constant temperature bath, for example at 60° C., for a period of 90 minutes, with continuous mixing of the polymerization charge. Reaction temperatures were attained in the mixture somewhat above that of the bath, up to a maximum 10° or 20° C. higher, due to the exothermic polymerization reaction, but the temperature decreased to that of the bath within less than 30 to 60 minutes and was maintained for the balance of the 90 minute reaction period.

The following results were obtained with the use of 1% by weight of the listed allyl compounds, based on the weight of the monomer charge.

|  | Allyl modifier | Inherent viscosity |
|---|---|---|
| Example: |  |  |
| 1[1] | None | 0.144 |
| 2 | Allyl alcohol | 0.138 |
| 3 | Allyl nitrile | 0.128 |
| 4 | Allyl chloride | 0.126 |
| 5 | Allyl bromide | 0.062 |

[1] Control.

The viscosity measurements were made by dissolving 2.0 grams of the washed and dried polymeric product in 100 milliliters of O-dichlorobenzene at 120° C. and determining the ratio of the viscosity of the polymer solution to that of the pure solvent, this value being termed the relative viscosity. The values of inherent viscosity, which are directly related to molecular weight of the polymers, are calculated as the ratio of ln (rel. vis)/C, that is the quotient of the natural logarithm of the relative viscosity and the concentration.

A further series of comparative polymerizations was carried out as in the above examples, but using the proportions of allyl bromide modifier as listed, expressed as percentage by weight of the monomer charge, resulting in the following data:

|  | Percent allyl bromide | Inherent viscosity | Molecular weight |
|---|---|---|---|
| Example: |  |  |  |
| 6 | [1] 0 | 0.144 | 120,000 |
| 7 | 0.26 | 0.107 | 83,000 |
| 8 | 0.50 | 0.0919 | 68,000 |
| 9 | 0.75 | 0.0811 | 57,500 |
| 10 | 1.0 | 0.0732 | 50,800 |
| 11 | 2.0 | 0.0493 | 31,000 |
| 12 | 4.0 | 0.0364 | 21,000 |

[1] Control.

The values of inherent viscosity were determined as described above and the molecular weights represent weight average values measured by the established gel permeation chromatography procedure.

In the following examples, large scale polymerization were carried out in a jacketed reaction vessel provided with a stirrer and condenser, the jacket having both heating and cooling means. The monomer charge consisted of 17.1 vinylidene chloride, 1.5 acrylonitrile and 0.187 acrylic acid, totalling 18.7 parts by weight, and in Examples 14 and 15, 0.0935 and 0.234 part by weight, respectively, of allyl bromide were added as modifier. The aqueous phase, of equal weight, contained 0.675 sodium lauryl sulfate as emulsifier, and 0.0312 sodium metabisulfite and 0.0234 ammonium persulfate as catalyst. The catalyst was added after the other ingredients had been mixed and warmed to 28° C. and the vessel was closed. The jacket temperature was thereafter maintained at 30° C. and the reaction vessel at a pressure of 15 pounds per square inch above atmospheric by controlling the flow of coolant through the condenser, thereby adjusting the reflux as desired. Stirring was continued after the cessation of reflux to a total reaction period of up to 4 hours. The following data were obtained:

|  | Percent allyl bromide modifier | Molecular weight |
|---|---|---|
| Example: |  |  |
| 13 | [1] 0 | 782,000 |
| 14 | 0.5 | 363,000 |
| 15 | 1.25 | 53,000 |

[1] Control.

Further similar runs were carried out at a higher temperature and pressure, wherein the jacket temperature was mantained at 50° C. and the reactor pressure was 25 pounds per square inch above atmospheric. The reaction mixture in these examples included 0.0935 part by weight of sodium metabisulfite and 0.1403 of ammonium persulfate, and the total reaction period was one hour. The following data were obtained:

|  | Percent allyl bromide modifier | Molecular weight |
|---|---|---|
| Example: |  |  |
| 16 | [1] 0 | 352,000 |
| 17 | 0.25 | 241,000 |
| 18 | 0.50 | 80,000 |

[1] Control.

The results listed in the above examples substantiate the significant control of molecular weight, which is effected by the use of the allyl bromide modifier in the polymerization of vinylidene chloride with a comonomer or a mixture of comonomers. Such control may likewise be effected by allyl bromide in the presence of emulsifiers such as metal salts of alkyl aryl sulfonates, or of auxiliary agents such as glycol or other water-soluble organic solvents, or of catalysts such as peroxides, azines or perborates, or of other known ingredients.

Vinylidene chloride copolymers, prepared as in the above illustrative examples in the presence of allyl bromide and thereby having its molecular weight or inherent viscosity controlled within a reduced range, display enhanced solubility properties. They dissolve readily in oxygen-containing solvents such as tetrahydrofuran, methyl ethyl ketone, dioxane, and mixtures thereof with benzene, toluene, or xylene, being capable of yielding clear fluid concentrated solutions containing up to about 30% to 40% by weight of the copolymer. Copolymers of similar composition, prepared in the absence of allyl bromide, and commercially available vinylidene chloride copolymers, form solutions in similar solvents containing up to about 15% to 20% by weight which generally display considerably less fluidity.

Lacquers of higher resin content are advantageous in that they require the removal of significantly reduced proportions of solvent in the preparation of coatings or of self-supporting films, and frequently enable the obtainment of superior properties of the resulting coating or film.

A significant further observation is that solutions of vinylidene chloride copolymers in accordance with the present invention display greater fluidity at the same, or even higher, concentration in a given solvent mixture than copolymers of similar composition, having about the same molecular weight (determined by the gel permeation chromatography procedure) which were prepared in the absence of allyl bromide.

The proportion of allyl bromide is preferably within the range of 0.1% to 5.0% by weight of the monomer mixture so as to result in a copolymer product having an average molecular weight of about 50,000 to 150,000, corresponding generally to a value of inherent viscosity within a range of about 0.07 to about 0.14. Such copolymers yield self-supporting films of excellent tenacity, fold endurance and vapor barrier properties and likewise form coatings of superior physical properties on films, such as regenerated cellulose, cellulose esters, cellulose ethers, various types of paper including wrapping papers, polyvinyl alcohol, polyolefins such as polyethylene or polypropylene, or other thermoplastic films. The coatings as described are well adapted for the formation of excellent heat seals, capable of withstanding humid storage conditions. Copolymers within the preferred range of molecular weight may advantageously be applied by coating with the use of aqueous dispersions, resulting in uniform coalesced surface layers displaying excellent physical and vapor-barrier properties.

While the mechanism by which the allyl bromide in accordance with this invention controls the emulsion polymerization of vinylidene chloride with its comonomers is not entirely understood, the observed data, principally the obtainment of molecular weight control without extending the reaction period, are consistent with postulating a chain transfer reactivity, resulting in the termination of adequately developed polymer chains while initiating other new ones, and also in minimizing the growth of branched chains.

The vinylidene chloride copolymers prepared in accordance with this invention which appear most advantageous for the preparation of self-supporting films and coatings result from the emulsion polymerization of monomeric mixtures containing about 90%–95% by weight vinylidene chloride and substantially the balance of a vinyl monomer, particularly about 1% to 9% of acrylonitrile or an alkyl acrylate or methacrylate or a mixture thereof and about 1% to 3% of acrylic, methacrylic acid or itaconic acid. The molecular weight is controlled, by carrying out the polymerization in the presence of allyl bromide modifier as described above, at a value substantially below that obtained in its absence and generally above about 20,000 preferably in the range of about 50,000 to 150,000. Excellent films and coatings are obtainable by deposition of the preferred copolymers from aqueous dispersion or from concentrated lacquers in solvents, such as methyl ethyl ketone-toluene or tetrahydrofuran-toluene, which are characterized by the desired strength, vapor barrier, and handling properties.

What is claimed is:

1. In the aqueous emulsion polymerization of a monomeric mixture consisting essentially of about 75% to 95% by weight of vinylidene chloride and substantially the balance of at least one other ethylenically unsaturated monomer copolymerizable with vinylidene chloride, the improvement comprising modifying the polymerization process to control the molecular weight and improve the physical properties and solubility characteristics of the resultant copolymer by the step of adding to said mixture of monomers before polymerization thereof about 0.05 to 10% by weight of allyl bromide.

2. A process as in claim 1, wherein said allyl bromide amounts to about 0.1 to 5% by weight of said monomer mixture.

3. A process as in claim 1, wherein said monomer mixture consists essentially of about 90% to 95% by weight vinylidene chloride, about 1% to 9% of at least one vinyl monomer selected from the group consisting of acrylonitrile, an alkyl acrylate and an alkyl methacrylate, and about 1% to 3% of at least one acidic vinyl monomer selected from the group consisting of acrylic acid, methacrylic acid, and itaconic acid.

4. A process as in claim 1 wherein the copolymer formed has a weight average molecular weight of about 50,000 to 150,000.

References Cited

UNITED STATES PATENTS

| 3,018,197 | 1/1962 | Covington et al. | 117—145 |
| 3,041,208 | 6/1962 | Hay et al. | 117—138.8 |

OTHER REFERENCES

Chem. Abstract, vol. 60, p. 9378c (Poly "a" olefins with regulated molecular wt.).

JOSEPH L. SCHOFER, Primary Examiner

JOHN KIGHT III, Assistant Examiner

U.S. Cl. X.R.

260—66, 78, 80.6, 80.73, 80.76, 80.77, 80.8, 80.81, 85.5, 85.7, 86.3, 87.7